United States Patent [19]

Chika et al.

[11] Patent Number: 5,202,566
[45] Date of Patent: Apr. 13, 1993

[54] VDT RADIATION PROTECTION SYSTEM

[76] Inventors: Hani E. Chika, 4521 Park Blvd., San Diego, Calif. 92116; Tariq J. Elias, 7358 Margerum Ave., San Diego, Calif. 92120

[21] Appl. No.: 813,441

[22] Filed: Dec. 26, 1991

[51] Int. Cl.⁵ .................................................. G21F 3/00
[52] U.S. Cl. ................................. 250/515.1; 359/630; 359/884
[58] Field of Search ...................... 250/515.1; 359/630, 359/722, 884

[56] References Cited

U.S. PATENT DOCUMENTS

| | | | |
|---|---|---|---|
| 2,291,406 | 7/1942 | Paehr | 250/515.1 |
| 2,349,457 | 5/1944 | Osterberg et al. | 359/722 |
| 3,443,138 | 5/1969 | Schwartz | 250/515.1 |
| 3,503,146 | 3/1970 | Woplin | 359/630 |
| 3,765,010 | 10/1973 | McAimsh et al. | 359/630 |
| 3,770,335 | 11/1973 | Colburn et al. | 359/884 |
| 4,261,647 | 4/1981 | Ellis | 359/630 |
| 4,335,959 | 6/1982 | Manning | 359/722 |
| 4,457,579 | 7/1984 | Thylen | 359/630 |
| 4,840,471 | 6/1989 | Mitani et al. | 378/203 |
| 4,845,402 | 7/1989 | Smith | 250/515.1 |
| 5,004,308 | 4/1991 | Hall et al. | 359/884 |
| 5,036,115 | 7/1991 | Gallas | 359/722 |

Primary Examiner—Bruce C. Anderson
Attorney, Agent, or Firm—Ralph S. Branscomb

[57] ABSTRACT

A protection system for a video display terminal (VDT) is designed for two basic purposes, first, the blockage and absorption of EMF, ultraviolet and X-rays from the VDT, and second, the elimination of glare from ambient light directly impacting the eye and reflected from the screen VDT. The invention comprises a dark, dull enclosure which adjustably connects to the front of the VDT and has a first, lower reflector having a metal-based reflective surface absorb some harmful rays and reflects the visual image and some of the harmful rays from the VDT to a second, upper reflector having an organic-based reflective surface which reflects the visual light spectrum image forward, so that it can be viewed by persons sitting in front of the VDT while allowing the harmful higher-frequency radiation to harmlessly pass through the plastic material. The first reflector has a grounded ferromagnetic screen lining to absorb EMF from the screen, and also preferably a lead foil lining to at least partially absorb higher frequency radiation such as UV and X-rays. Eyeglasses with an annular gradient tint are also preferably used with the system to further reduce glare.

22 Claims, 2 Drawing Sheets

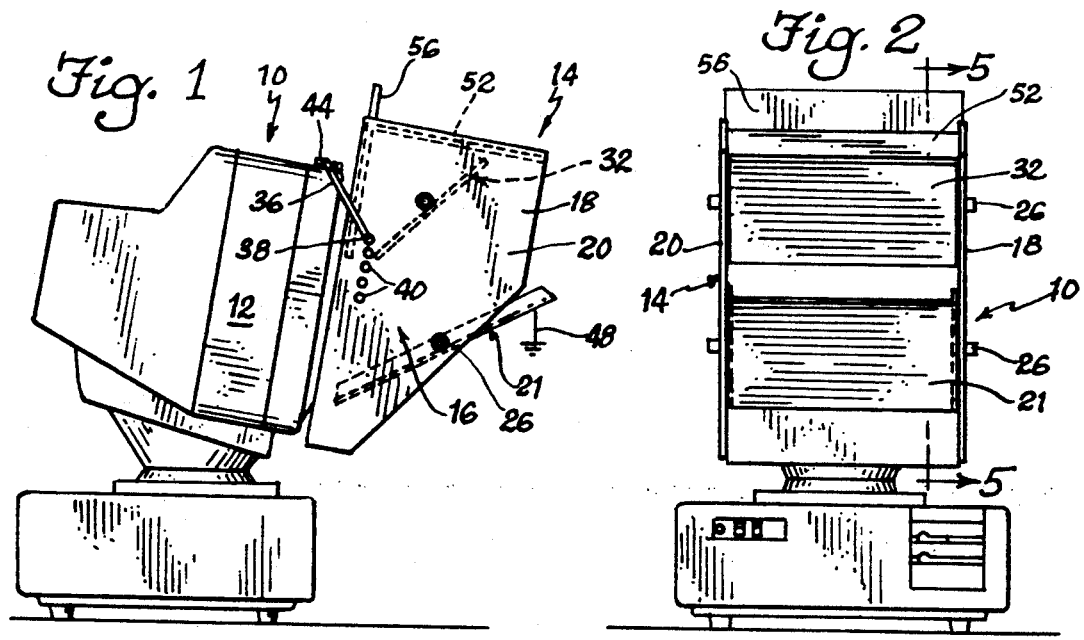
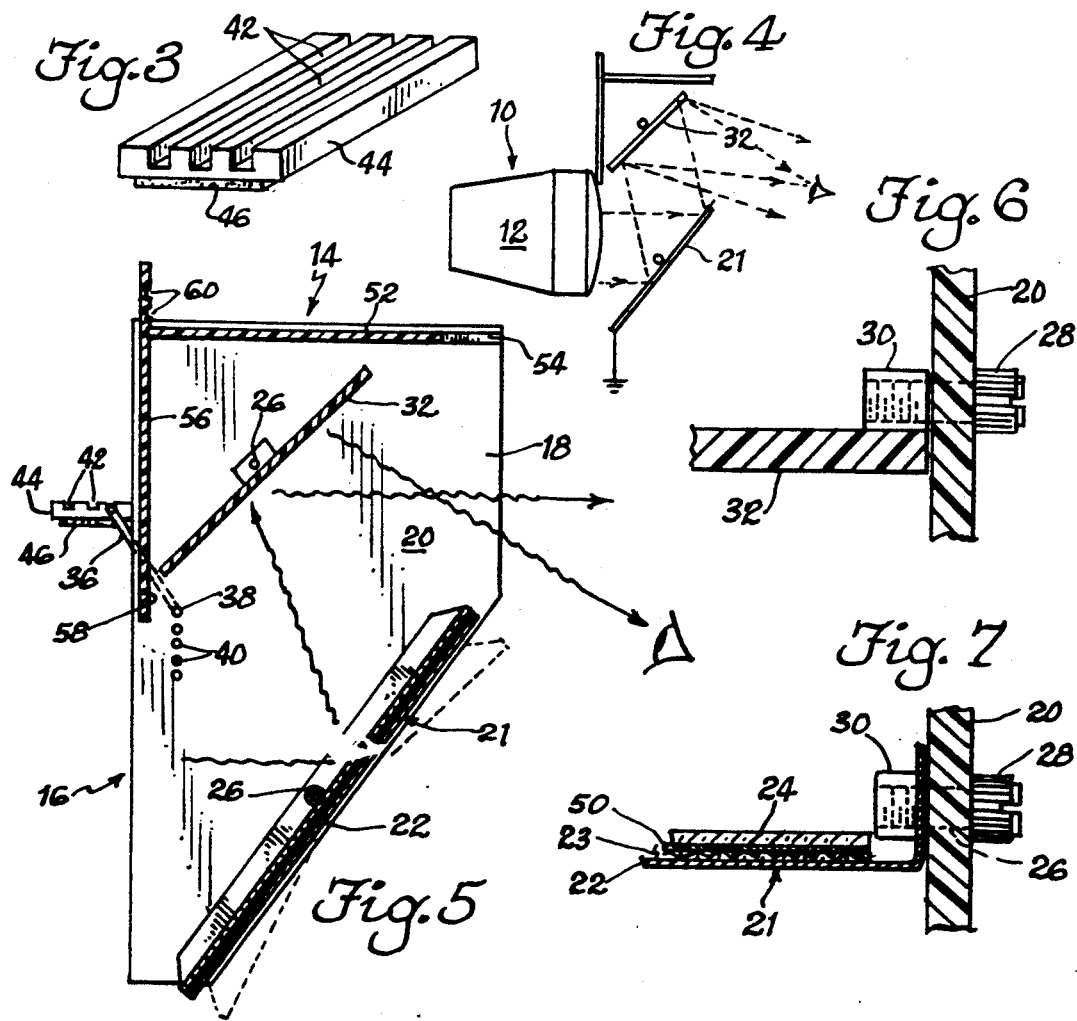

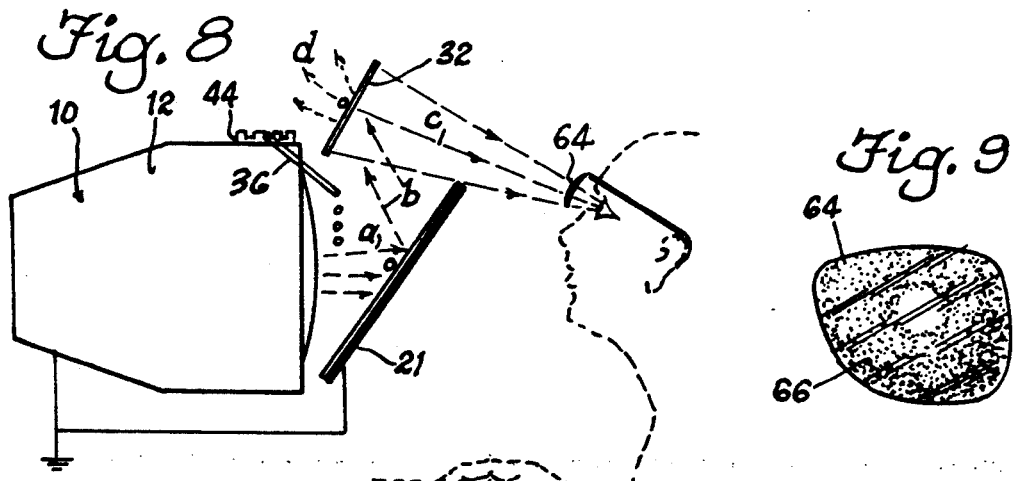
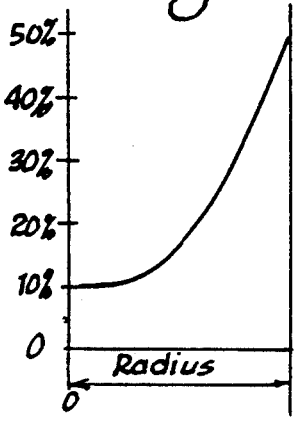
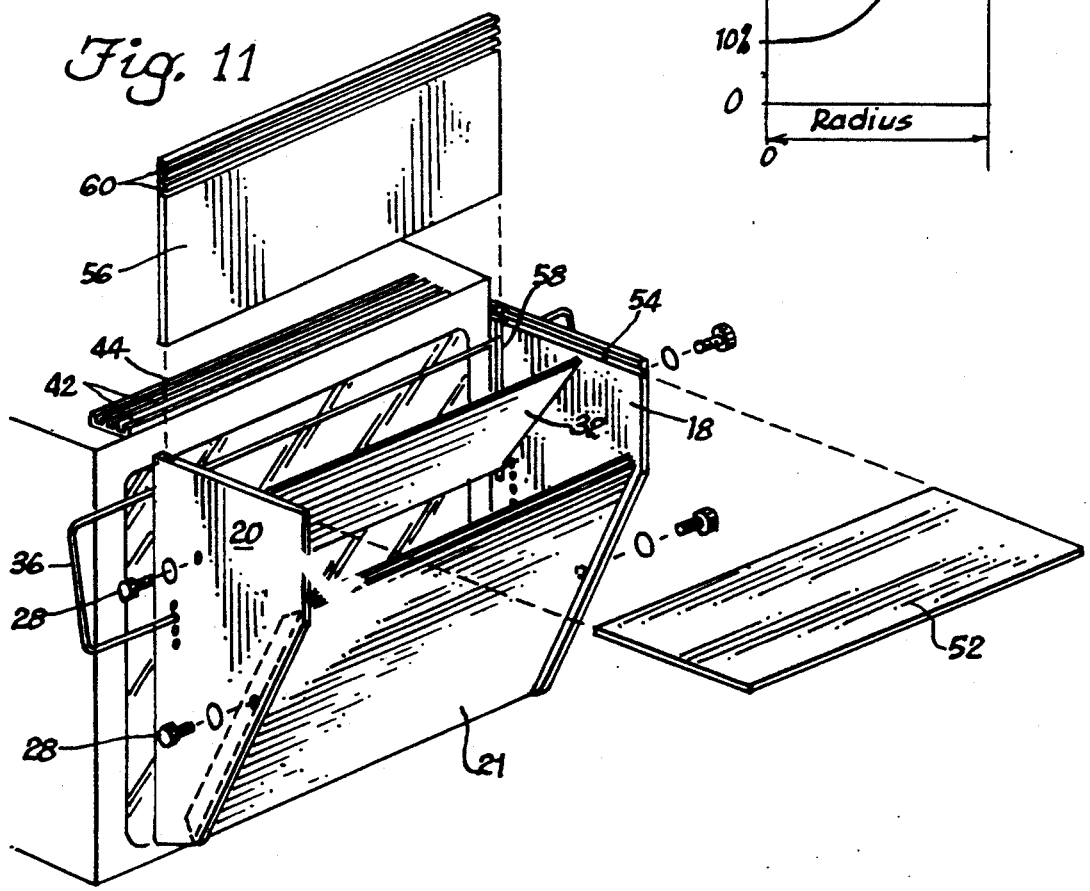

VDT RADIATION PROTECTION SYSTEM

BACKGROUND OF THE INVENTION

The invention is in the field of computers and particularly pertains to the protection of the computer operator from radiation from the video display terminal (hereinafter "VDT").

EMF radiation is currently of great concern to electronics-based societies. The EMF from high-tension wires passing through the countryside has been correlated with an increased incidence of certain cancers of persons working, living or playing beneath the high tension wires, as well as problems with animals which graze beneath the wires, including interference with the reproduction process.

This concern has spread to computers, and particularly to the radiation emitted by the CRT. Clearly, this is not a problem for an occasional computer user, but increasingly many people spend eight hours a day in front of a VDT. Moreover, depending on the type of VDT, there may be a small but significant amount of X-ray and UV leakage as well as EMF. Federal regulations limit X-ray emissions from CRTs to no more than 0.5 mR/hr. It is somewhat early to make firm conclusions about the long-term effects of prolonged exposure to the radiation from VDTs, and for this very reason there is a movement afoot to provide protection from the cumulative effects of this potentially harmful radiation. Of special concern is the unknown but potential harm done to pregnant women. In addition to the long-term effects, there is mounting evidence that high-frequency radiation causes eye strain.

Although some screens have been provided with VDT shields which attach to the front of the VDT, it is believed that these are not very effective in stopping EMF, glare and other harmful high-frequency radiation such as X-rays. Whereas the low-level X-rays produced by the VDT are currently of less concern than the EMF, the synergistic effects of the combination is an unknown.

In addition to the VDT shields, VDT eyeglasses have been produced which eliminate UV and reduce glare. However, they do not provide body protection at all, and they reduce the visible light to the eye.

Thus, for the most part, despite the current concern about prolonged computer use, the typical computer operator nonetheless remains essentially unprotected from the VDT radiation. In addition to the radiation danger, continual use of computers is very hard on the eyes, largely because of incident glare from ambient light sources, both directly on the eye and reflected from the VDT screen. The eye strain and possible eye damage is particular acute for those who do not have perfect vision, with the most distress being experienced as a progressive function of increased refractive correction requirements for any particu. operator.

The glare from ambient light caus. the pupil to contract so that it is under a constant strain inasmuch as pupillary muscles are used to make this contraction. Once the pupil is contracted, which is caused automatically by the net amount of light admitted to the eye which includes glare, then the image that the computer operator wishes to see may not be bright enough, since as it is the glare that is causing pupillary contraction more than the computer image.

Some computer operators report considerable eye strain, with redness and swelling in the eye areas and perhaps tearing, after only an hour or two of use of a computer if the glare is particularly bad. Others go for longer periods of time, but the problem is universal in nature.

SUMMARY OF THE INVENTION

The present invention fulfills the above-stated needs by providing a hood for a VDT which accomplishes the dual purposes of eliminating glare, and preventing the harmful radiation such as EMF or X-rays from reaching the body. The hood aspect of the invention, which eliminates ambient light, is basically a black box which is adjustably mounted over the face of the VDT so that only a frontal opening is available to pass light, eliminating all side lighting.

The radiation-blocking feature of the invention is accomplished primarily by an adjustable, lower reflector which has both a ferromagnetic screen lining and a lead foil lining, with the ferromagnetic screen lining being grounded so that EMF will positively not penetrate beyond this layer. X-rays are absorbed in the lead foil layer. The reflector thus absorbs some of the harmful radiation, and also reflects some of it, particularly UV and some X-rays.

A second reflector is adjustably positioned above the first reflector and reflects the visual image from the first reflector forward, to the viewer. The second reflector is plastic and only reflects visual spectrum light, from about 400 to 700 nanometers in wavelength, so that radiation of any kind that is above or below this spectral range which is not absorbed by, but is rather reflected by, the first reflector passes harmlessly upwardly through the second reflector. The whole body is thus protected from radiation leakage, not just the eyes, and protection from UV, EMF, and X-rays is achieved.

BRIEF DESCRIPTION OF THE DRAWINGS

FIG. 1 is a side elevation view of the invention mounted on a computer;

FIG. 2 is a front elevation view of the invention as arranged in FIG. 1;

FIG. 3 is a perspective view of the hood attachment block;

FIG. 4 is a diagrammatical side elevation view illustrating the passage of the image radiation from the computer CRT to the viewer;

FIG. 5 is a section taken along line 5—5 of FIG. 2;

FIG. 6 is a detail of the adjustment mechanism of the second reflector, shown partially in section;

FIG. 7 is another partially sectioned detail of the attachment means of the first reflector, illustrating the reflective surface, the lead foil and the ferromagnetic screen in section;

FIG. 8 is a diagrammatic side elevation view of the invention illustrating the direction of CRT wave travel vis-a-vis a viewer, and the use of the annular gradient-tint protective glasses;

FIG. 9 is a front elevation view illustrating an eyeglass lens with an annular gradient tint;

FIG. 10 is a graph illustrating a typical light absorption curve across the radius of an annular gradient tint lens; and, FIG. 11 is an exploded view of the reflector and enclosure portion of the system.

DETAILED DESCRIPTION OF THE PREFERRED EMBODIMENT

A typical computer is shown at 10 with its video display terminal (VDT) indicated at 12. In front of the VDT is the protective hood 14 of the present invention. The hood comprises a frame 16, which in the preferred embodiment is the hood enclosure 18 itself, although were the invention limited to protection from emitted radiation only without the glare-reduction function, the hood could be abbreviated greatly, leaving only the frame structure necessary to support the reflectors as described below, and as suggested by FIGS. 4 and 8.

The enclosure 18 defines a pair of sidewalls 20 which are parallel and spaced adequately to fit alongside the left and right edges of the VDT, as shown in FIG. 2. The sidewalls of the VDT are held in place by means of a first reflector 21, which has an aluminum tray 22, which is pivotally mounted by its flanges at 26 by a bolt and nut combination 28 and 30 which permits rotation, but which can be locked at any particular position by tightening the bolts. The second reflector 32 is also pivotally adjustable with the same bolt-and-nut combination 28 and 30.

The pivotal reflectors are adequate supported to hold the two sidewalls together. The hood is held to the VDT by means of a bail 36, which has inwardly-directed ends 38 which engage in any pair of bail holes 40 bored into the sidewalls of the hood as shown in FIGS. 1 and 5. The crossbar portion of the bail seats in a selected one of the three grooves 42 in the attachment or mounting block 44, which is securely held on to the top of the VDT by means of a double-sided adhesive coated foam slab 46.

The action of the reflectors is as follows. Both reflectors are rotated into adjusted position such that the viewer sees the image approximately as indicated in FIG. 8. The aluminum tray 22 of the reflector 21 is also grounded AS INDICATED AT 48 to the VDT ground to short-circuit the electrical components of the EMF and help eliminate static. The tray also has a ferromagnetic screen 23 bonded to its upper surface, which is intended to shield the operator from the magnetic field component of the EMF from the VDT.

On top of the ferromagnetic screen is a layer of lead foil 50, which will absorb most of the X-rays, reflecting some of them. On top of the foil shield is a reflective surface 24, which could be a chromed, polished glass surface or any other kind of highly reflective surface, which will pass most EMF and X-rays, and absorb some UV and reflect some. It is not critical that the first reflector 21 absorb all or most of the harmful radiation, as long as it doesn't transmit it.

All radiation reflected from the first reflector is reflected to the second reflector 32, which is where the remaining separation occurs. The second reflector, unlike the first reflector 21, comprises a sheet of plastic such as polycarbonate or allyldiglycol carbonate, marketed as an eyeglass lens material under the trademark CR-39 TM, with a highly polished reflective surface darkened with an organic (non-metallic) dye such as black azo dye. The preferred embodiment is treated with a black azo dye to a very dark density so that 95% to 97% of visible light which passes across the surface into the material is absorbed, but visible light reflection is maximized. The surface of the second reflector reflects visible light in the range of 400-700 nanometers in wavelength, but passes through all other wavelengths, so that all high-frequency radiation such as UV and X-rays harmlessly pass through this reflector to be dissipated in the environment, away from the operator.

This action is best shown in FIG. 8. In this figure, rays indicated at a are emitted from the VDT and impinge on the first reflector 21. At 21, the EMF is largely absorbed, and the UV and X-rays partially absorbed. Non-absorbed radiation, including substantially all of the visible spectrum, is reflected as rays b to the second reflector 32. At the second reflector, high-frequency, harmful radiation is passed through as rays d, and the visible image is reflected to the viewer, as indicated at c.

As seen in both FIGS. 3 and 8, the harmful radiation from the VDT screen is intercepted by the reflector combination so that the worker's body is in the shadow of the reflectors and thus shielded. These figures show an exaggerated posture in which the operator appears to be looking up, but the reflectors would ordinarily be arranged so that the operator is looking straight ahead and assumes the same posture, looking straight ahead or somewhat downward as he or she would were the enclosure not there.

It will be noted that the bail 36 is multiply adjustable in the grooves 42, and the first and second reflectors both pivot. In any event, the VDT has a general longitudinal or axial axis and the reflectors do not deflect the VDT image left or right of that axis, but only upwardly and rearwardly in a vertical plane by the first reflector, and forwardly in the same basic vertical plane, which is parallel to the longitudinal axis of the VDT, with the second reflector. The ray diagram of FIGS. 4 and 8 are diagrammatic only, but with the multiple adjustability of the unit, which has been tried on the job, for any known type of computer VDT, the reflector and the hood itself can be adjusted properly so that full screen viewing is possible without any substantial gaps which could pass radiation to the body. The eyes and body do not actually face the VDT directly.

It should be noted that the upper and lower reflectors could be reversed in function, with the upper reflector receiving the light first and reflecting it to the lower reflector, but this arrangement tends to protect the eyes only, and is geometrically awkward, so that the illustrated embodiment works better.

The hood 14, in addition to having the sidewalls 20 and the reflectors, is intended to virtually eliminate all glare by excluding ambient light from the screen of the VDT. This is accomplished in the preferred embodiment by means of a top wall 52 which slides forward and rearwardly in channels 54, and a rear wall 56 which slides up and down in rear wall channels 58. The rear wall is preferably provided with a plurality of adjustment slots 60 which seat the rear edge of the top wall 52 as shown in FIG. 5, so that the rear wall is adjustable to accommodate the positioning of the hood on any particular VDT.

The combination of the top wall and rear wall, together with the sidewalls and the first reflector 24 effectively eliminate most ambient light from the VDT screen. All of the wall members are black and dull-finished to eliminate internal reflection. As described above, the first, lower reflector is made of a normal silvered glass or plastic pane and will partially transmit and partially reflect harmful radiation. The upper reflector, being made of highly polished polycarbonate or CR-39 tinted to a density of 92-97 percent with an organic pigment such as black azo dye, reflects only visible light.

Although the bulk of glare and extraneous light is eliminated by the dark hood, there are other factors that must be considered when protecting the operator from glare-induced eye strain. First, not all of the glare is eliminated by the hood. Also, often there is light that could be coming from an angle (such as the light from ceiling fixtures) which tends to interfere with vision. This light causes the pupils to constant contract, straining the eyes.

To counter this, a pair of eyeglasses 62 with lenses 64 having an annular gradient 66 is provided. These glasses, which could be either prescription or not, have a clear center which measures about 1 cm. to 2 cm., and outside of the center they have a steep gradient tint that may vary from full light transmission at the center to as little as 10% transmission at the edges.

This configuration accommodates the optical facts of computer use, in which only the very central portion of the field of vision is used anyway, about a 15 degree solid angle. Light impinging on the eyes at greater angles serves to constrict the pupil without providing any useful visual information, resulting in the apparent dimming of the useful image. Therefore, glasses having a clear central portion wide enough to allow viewing the VDT screen but excluding other light enhances the image in conjunction with the beneficial effects of the darkened hood described above.

A computer operator can sit in front of a VDT equipped with the hood disclosed herein, wearing the glasses described herein, for hours on end in many instances without reporting any eye discomfort whatsoever. The same operator, when the hood and glasses are removed, report eye distress within an hour or two if the operator has sensitive eyes. There is thus no doubt that the elimination of glare plays a major part in the reduction of eye strain complaints among workers, so that the double function of the disclosed system produces immediate advantages in addition to elimination or reduction of the as yet unknown deleterious effects of various electromagnetic rays which do not fall within the visible spectrum.

It is hereby claimed:

1. A radiation reduction system which attaches to the front of a VDT comprising:
   (a) a frame including an anti-glare enclosure having an opaque top wall and spaced opaque sidewalls defining an open front viewing area;
   (b) mounting means for mounting said frame on a CRT;
   (c) a first reflector mounted in said enclosure substantially in front of said VDT and being positioned to reflect on image from said VDT to a second reflector and a non-visible wavelength blocking means coupled with said first reflector to at least partially block radiation frequencies outside the visible spectrum;
   (d) a second reflector being mounted in said enclosure and positioned to reflect an image from said first reflector to a viewing station in front of said first reflector, such that a person sitting at said viewing station can observe substantially all of an image on said VDT through said viewing area while being substantially shielded from non-visible radiation from the VDT by said first reflector and by ambient glare, by said top wall and said sidewalls.

2. Structure according to claim 1 wherein said first reflector is in front of and adjacent the lower portion of said VDT and said second reflector is above said first reflector in front of the upper portion of said VDT such that an image from said VDT is first reflected upwardly and rearwardly by said first reflector and the reflected forwardly by said second reflector and at least one of said reflectors is pivotally adjustable about an axis transverse to said longitudinal axis.

3. Structure according to claim 2 wherein both of said reflectors are rotationally adjustable in said frame about a horizontal axis.

4. Structure according to claim 1 wherein said mounting means permits vertical adjustment of said frame on said VDT.

5. Structure according to claim 4 wherein said mounting means comprises a bail having attachment means attaching same to the top of said VDT, said bail having ends engaging said frame.

6. Structure according to claim 5 wherein said attachment means comprises a grooved block mounted atop said VDT and having a plurality of parallel grooves to selectively seat said bail.

7. Structure according to claim 6 wherein said frame provides a plurality of selectable attachment point pairs for the ends of said bail and said bail is rotatably engaged in selected ones of said attachment points.

8. Structure according to claim 1 wherein said first reflector is lined with a screen of ferromagnetic material.

9. Structure according to claim 1 wherein said first reflector is lined with lead foil.

10. Structure according to claim 1 wherein said sidewalls are substantially parallel with the sides of said VDT and including a rear wall extending from the top of said VDT to said top wall.

11. Structure according to claim 10 wherein said top wall is vertically adjustable to accommodate different frame adjustments and different user anatomies.

12. Structure according to claim 11 wherein said sidewalls define top wall channels in which said top wall slidably seats, and substantially vertical rear wall channels in which rear wall seats.

13. Structure according to claim 12 wherein said rear wall defines a plurality of transverse slots which are selectably engageable by the rear edge of said top wall, whereby said rear wall is made adjustable.

14. Structure according to claim 1 wherein one of said reflectors is in front of and adjacent the lower portion of said VDT and is lined with at least one radiation-absorbing layer, and the other of said reflectors is substantially transparent to electromagnetic radiation above the visible spectrum.

15. Structure according to claim 14 wherein said first reflector is said one of said reflectors and said second reflector is said other of said reflectors.

16. Structure according to claim 1 wherein said second reflector comprises a sheet of polycarbonate.

17. Structure according to claim 16 wherein said sheet of polycarbonate is impregnated with black azo dye.

18. Structure according to claim 1 and including a pair of eyeglasses having lenses with a clear central region surrounded by an annular gradient tint darkening toward the edges of said lenses, such that only a solid cone of light wide enough to encompass said VDT is admitted to the eye.

19. Structure according to claim 18 wherein said clear central portion is on the order of 1 cm to 2 cm in diameter.

20. A radiation reduction system for a VDT comprising:
(a) a frame;
(b) mounting means for mounting said frame on a CRT;
(c) a first reflector mounted in said frame substantially in front of said VDT and being positioned to reflect an image from said VDT to a second reflector; and
(d) a second reflector being mounted in said frame and positioned to reflect an image from said first reflector to a viewing station in front of said first reflector, such that a person sitting at said viewing station can observe substantially all of an image on said VDT while being substantially shielded from non-visible radiation from the VDT by said first reflector;
(e) said second reflector comprising a sheet of allyldiglycol carbonate.

21. Structure according to claim 20 wherein said sheet of allyldiglycol carbonate is impregnated with black azo dye.

22. A radiation reduction system for a VDT comprising:
(a) a frame;
(b) mounting means for mounting said frame on a CRT;
(c) a first reflector mounted in said frame substantially in front of said VDT and being positioned to reflect an image from said VDT to a second reflector; and
(d) a second reflector being mounted in said frame and positioned to reflect an image from said first reflector to a viewing station in front of said first reflector, such that a person sitting at said viewing station can observe substantially all of an image on said VDT while being substantially shielded from non-visible radiation from the VDT by said first reflector;
(e) said first reflector being lined with a screen of ferromagnetic material; and,
(f) said first reflector being carried on a grounded tray.

* * * * *